US009521387B2

(12) United States Patent
Foltin et al.

(10) Patent No.: US 9,521,387 B2
(45) Date of Patent: Dec. 13, 2016

(54) DETECTION OF LIGHT FOR ASCERTAINING COLOR INFORMATION

(71) Applicant: Robert Bosch GmbH, Stuttgart (DE)

(72) Inventors: Johannes Foltin, Ditzingen (DE); Wolfgang Sepp, Munich (DE)

(73) Assignee: ROBERT BOSCH GMBH, Stuttgart (DE)

( * ) Notice: Subject to any disclaimer, the term of this patent is extended or adjusted under 35 U.S.C. 154(b) by 0 days.

(21) Appl. No.: 14/409,954

(22) PCT Filed: Apr. 30, 2013

(86) PCT No.: PCT/EP2013/058984
§ 371 (c)(1),
(2) Date: Dec. 19, 2014

(87) PCT Pub. No.: WO2013/189652
PCT Pub. Date: Dec. 27, 2013

(65) Prior Publication Data
US 2015/0341610 A1   Nov. 26, 2015

(30) Foreign Application Priority Data

Jun. 20, 2012 (DE) .................. 10 2012 210 370
Nov. 22, 2012 (DE) .................. 10 2012 221 356

(51) Int. Cl.
H04N 9/79 (2006.01)
G06K 9/00 (2006.01)
(Continued)

(52) U.S. Cl.
CPC ........... H04N 9/7904 (2013.01); G01J 1/0474 (2013.01); G01J 1/0488 (2013.01); G01J 1/4228 (2013.01);
(Continued)

(58) Field of Classification Search
CPC .................................................. G06K 9/00825
See application file for complete search history.

(56) References Cited

U.S. PATENT DOCUMENTS 5,796,094 A * 8/1998 Schofield ............... B60N 2/002
250/208.1
6,040,906 A   3/2000 Harhay
(Continued)

FOREIGN PATENT DOCUMENTS

DE   102009056178   6/2011
DE   102010003668   10/2011
(Continued)

OTHER PUBLICATIONS

International Search Report for PCT/EP2013/058984, issued on Aug. 8, 2013.

Primary Examiner — Michael Osinski
(74) Attorney, Agent, or Firm — Norton Rose Fulbright US LLP

(57) ABSTRACT

A sensor is provided for detecting light, including an imager which includes a first imaging element and a second imaging element situated adjacent to the first imaging element, and including an optical element which is designed for directing a first component of light incident in the direction of the first imaging element onto the second imaging element, and for allowing a second component of the light incident in the direction of the first imaging element to strike the first imaging element.

11 Claims, 9 Drawing Sheets

(51) Int. Cl.
*G06K 9/46* (2006.01)
*G01J 1/04* (2006.01)
*G01J 1/42* (2006.01)
*G06K 9/20* (2006.01)

(52) U.S. Cl.
CPC ....... *G06K 9/00791* (2013.01); *G06K 9/00825* (2013.01); *G06K 9/209* (2013.01); *G06K 9/2018* (2013.01); *G06K 9/4652* (2013.01); *G06K 9/4661* (2013.01)

(56) References Cited

U.S. PATENT DOCUMENTS

| | | | | |
|---|---|---|---|---|
| 6,774,988 B2* | 8/2004 | Stam | ............... | B60Q 1/1423 250/208.1 |
| 7,286,302 B2* | 10/2007 | Ohzawa | ............... | G02B 13/18 359/708 |
| 7,365,769 B1* | 4/2008 | Mager | ............... | B60Q 1/44 340/467 |
| 7,477,304 B2* | 1/2009 | Hu | ............... | H04N 9/045 348/272 |
| 7,565,006 B2* | 7/2009 | Stam | ............... | B60Q 1/085 315/82 |
| 7,745,779 B2* | 6/2010 | Conners | ............... | H04N 5/2351 250/208.1 |
| 8,035,068 B2* | 10/2011 | Ishigaki | ............... | H01L 27/14621 250/208.1 |
| 8,076,745 B2* | 12/2011 | Nishiwaki | ............... | H01L 27/14621 257/433 |
| 8,514,319 B2* | 8/2013 | Hiramoto | ............... | H04N 5/369 348/272 |
| 8,712,637 B2* | 4/2014 | Ehlgen | ............... | B60Q 1/14 701/36 |
| 8,754,965 B2* | 6/2014 | Han | ............... | G02B 27/0025 348/222.1 |
| 8,817,140 B2* | 8/2014 | Simon | ............... | G06T 3/4015 348/113 |
| 8,860,855 B2* | 10/2014 | Hiramoto | ............... | H01L 27/14621 348/272 |
| 8,965,142 B2* | 2/2015 | Schwarzenberg | ............... | G06K 9/00825 340/907 |
| 2002/0135825 A1 | 9/2002 | Lee et al. | | |
| 2003/0063210 A1* | 4/2003 | Tsuboi | ............... | H01L 27/14621 348/340 |
| 2004/0021853 A1* | 2/2004 | Stam | ............... | B60Q 1/1423 356/218 |
| 2004/0143380 A1* | 7/2004 | Stam | ............... | B60Q 1/085 701/36 |
| 2004/0201483 A1* | 10/2004 | Stam | ............... | B60Q 1/1423 340/600 |
| 2006/0044427 A1 | 3/2006 | Hu | | |
| 2006/0087747 A1 | 4/2006 | Ohzawa et al. | | |
| 2007/0177014 A1* | 8/2007 | Frenzel | ............... | G06K 9/00798 348/148 |
| 2008/0067330 A1* | 3/2008 | Yamamoto | ............... | G01J 3/51 250/226 |
| 2009/0200451 A1* | 8/2009 | Conners | ............... | H04N 5/2351 250/208.1 |
| 2010/0019129 A1* | 1/2010 | Ishigaki | ............... | H01L 27/14621 250/208.1 |
| 2010/0134616 A1* | 6/2010 | Seger | ............... | H04N 9/07 348/135 |
| 2010/0188537 A1* | 7/2010 | Hiramoto | ............... | H01L 27/14621 348/294 |
| 2010/0214455 A1* | 8/2010 | Simon | ............... | G06T 3/4015 348/273 |
| 2011/0037869 A1* | 2/2011 | Hiramoto | ............... | G02B 5/045 348/222.1 |
| 2011/0164156 A1* | 7/2011 | Hiramoto | ............... | H01L 27/14625 348/272 |
| 2012/0069181 A1* | 3/2012 | Xue | ............... | G01J 3/0229 348/148 |
| 2013/0027560 A1* | 1/2013 | Seger | ............... | H04N 9/735 348/148 |
| 2013/0135493 A1* | 5/2013 | Hiramoto | ............... | H01L 27/14621 348/222.1 |
| 2014/0078355 A1* | 3/2014 | Hiramoto | ............... | H01L 27/14629 348/273 |
| 2014/0184800 A1* | 7/2014 | Hirai | ............... | G01N 21/958 348/148 |
| 2015/0120160 A1* | 4/2015 | Foltin | ............... | B60W 30/0956 701/70 |

FOREIGN PATENT DOCUMENTS

| | | |
|---|---|---|
| WO | WO2004/011890 | 2/2004 |
| WO | WO2010/085000 | 7/2010 |

\* cited by examiner

DETECTION OF LIGHT FOR ASCERTAINING COLOR INFORMATION

FIELD OF THE INVENTION

The present invention relates to a sensor and a method for detecting light, and a method and a device for ascertaining color information.

BACKGROUND INFORMATION

Vehicles are equipped with headlights which emit white light, and with taillights which emit red light. The color of the lights of another vehicle may be evaluated to determine whether the other vehicle is approaching the host vehicle or is moving away from the host vehicle.

PCT Published Patent Application No. WO 2004/011890 A1 relates to an optical system via which small, distant light sources may be reliably detected.

SUMMARY

Against this background, the present invention provides a sensor and a method for detecting light, and a method and a device for ascertaining color information.

To be able to recognize the color of a small light source, such as a distant light of a vehicle, based on reception of the light source by an imager, the light emitted by the light source may be influenced by an optical element before striking sensitive imaging elements of the imager. As the result of the influencing, it may be ensured that the emitted light is detected by at least two imaging elements of the imager. The at least two imaging elements may be provided for detecting different colors or frequency ranges of the emitted light. The color may be reliably determined in this way, even for very small light sources.

A sensor for detecting light has the following features:

an imager which includes a first imaging element and a second imaging element situated adjacent to the first imaging element; and an optical element which is designed for directing a first component of light incident in the direction of the first imaging element onto the second imaging element, and for allowing a second component of the light incident in the direction of the first imaging element to strike the first imaging element.

The imager may be an image sensor or an imaging device, such as a camera. The imager may include a field composed of at least the two imaging elements, or composed of a plurality of imaging elements situated adjacent to one another. A first imaging element may in each case be situated directly adjoining a second imaging element. Each imaging element may be designed for detecting an intensity of incident light on a sensitive surface of the imaging element, and for generating an image signal which represents the intensity. An imaging element may be understood to mean a pixel. The light may correspond to a light beam which is emitted by a light source. Due to its distance from the sensor (viewed from the imager), the light source may have dimensions which are small enough that the additional light beams which surround the light incident in the direction of the second imaging element include no information concerning the light source. If the optical element were not present, the light incident in the direction of the second imaging element would fall solely on the second imaging element, and no adjacent imaging element would be illuminated by the light. Due to the optical element, light incident in the direction of the second imaging element may be expanded or fanned out, so that, in addition to the second imaging element, the first imaging element is also illuminated by the light which is influenced by the optical element. Thus, information contained in the light, such as information about the light source, may be detected by the two adjacent imaging elements.

The optical element may be designed for removing frequency components of the light which are above a threshold. This corresponds to a soft focus. In this way, light sources which appear small may be imaged at least on the two imaging elements.

For example, the optical element may include a diffuser or a defocusing device. By using such an element, blurring may be produced which results in the light incident in the direction of the second imaging element being expanded and entering via an outer boundary of the second imaging element. The light is thus imaged in a blurred manner on the plane of the imaging elements.

According to one specific embodiment, the second imaging element may be sensitive to a first color and be insensitive to a second color. The first imaging element may be sensitive to the second color. A color sensitivity of an imaging element may be determined with the aid of a color filter which is associated with the imaging element and through which the incident light on the imaging element is led. For example, the second imaging element may have a sensitivity to the color red, and the first imaging element may have a sensitivity to the color white. Known imagers may therefore be used.

The optical element may be designed for directing a first component of a light component, corresponding to the first color, of the light incident in the direction of the first imaging element onto the second imaging element, and for allowing a second component of the light component, corresponding to the first color, of the light incident in the direction of the first imaging element to fall on the first imaging element. In addition, the optical element may be designed for allowing a light component, corresponding to the second color, of the light incident in the direction of the first imaging element to fall completely on the first imaging element. In this way, for example only a certain color component of the light may be imaged in a blurred manner on the imaging elements.

According to one specific embodiment, the optical element may include a diffraction structure, situated at a distance from the imaging elements, for diffracting at least a portion of the light, incident in the direction of the first imaging element, in the direction of the second imaging element. The diffraction structure may be made up of diffraction elements situated at a distance from one another. The first component of the light may be deflected by such a diffraction element, i.e., may undergo a change in direction, and may thus strike the second imaging element. A distance between the imaging elements and the diffraction structure may be selected in such a way that the first component of the light is able to reach a surface of the imager associated with the second imaging element due to the deflection by the diffraction structure. A layer which is permeable to the light may be situated between the imaging elements and the diffraction structure. This allows a simple design of the sensor.

Such a diffraction structure may have a lattice structure, a linear structure, or a point structure, for example. Such structures are particularly suitable when the imager includes a plurality of first and second imaging elements.

According to one specific embodiment, the first imaging element and the second imaging element may have the same color sensitivity. In addition, the diffraction structure may be designed as a color filter. Alignment of the diffraction structure with the imaging elements may thus be dispensed with or simplified. Furthermore, the imager may be manufactured more easily, since adjacent first and second imaging elements may have the same design.

The imager may be a semiconductor element. The imager may be manufactured using CMOS technology or CCD technology, for example. An imaging element may be implemented as a photodiode. Imagers which are customary for video cameras may thus be used.

A method for detecting light includes the following steps:

directing a first component of light incident in the direction of a first imaging element onto a second imaging element, the first imaging element being situated adjacent to the second imaging element on an imager;

allowing a second component of the light incident in the direction of the first imaging element to strike the first imaging element;

detecting the first component, using the second imaging element; and detecting the second component, using the first imaging element.

The method may be carried out using an optical element mentioned above which is situated in front of the imaging elements in the direction of incidence of the light.

A method for ascertaining color information of light which is detected by a mentioned sensor includes the following step:

comparing an intensity value of a first image signal of the first imaging element to an intensity value of a second image signal of the second imaging element in order to ascertain the color information.

An intensity value of an image signal of an imager may represent a light intensity which is detected by the imager. For example, the intensity value may be larger the higher the light intensity which is detected by the imager. The image signal may be an electrical signal, and the intensity value may be, for example, a value of a voltage or an electric current.

A corresponding device for ascertaining color information of light which is detected by a mentioned sensor has the following feature:

a device for comparing an intensity value of a first image signal of the first imaging element to an intensity value of a second image signal of the second imaging element in order to ascertain the color information.

According to one specific embodiment, a method for controlling an incidence of light on an imager which includes at least two adjacent imaging elements of different color sensitivity includes the following steps:

receiving a light component which includes light information of a light source, the light component having an extent which corresponds to a surface of a single one of the imaging elements of the imager; and expanding the light component to obtain an expanded light component having an increased extent which corresponds at least to a surface of two adjacent imaging elements of the imager.

In the step of expanding, frequency components of the light component above a threshold frequency may be filtered out to obtain the expanded light component. A low pass filter may be used for this purpose. The threshold frequency may be selected as a function of a geometric shape and configuration of the imaging elements, and as a function of a division of the various color sensitivities among the imaging elements.

In addition, in the step of expanding, the light component may be guided through a diffuser in order to obtain the expanded light component. A diffuser may be an optical element which is introduced into the beam path and which is designed for blurring in a targeted manner an image generated by the imager, thus reducing the edge sharpness of the image. This is particularly suitable for recording objects situated at different distances away.

Furthermore, in the step of expanding, the light component may be expanded by defocusing in order to obtain the expanded light component. This is particularly suitable for recording flat objects.

According to one specific embodiment, the method includes a step of dividing the light component into a first light component having a first color component, and a second light component having a second color component. In the step of expanding, the second color component may be expanded in order to obtain an expanded second light component. In a step of combining, the first light component may be combined with the expanded second light component in order to obtain the expanded light component. Color-specific blurring may be produced by decoupling the second light component. For example, a red component of incident light may be made blurred. This is suitable in imagers which have only a few of the imaging elements associated with the color red in relation to imaging elements associated with the color white.

According to one specific embodiment, each of the imaging elements may include a number of imaging points, each of the imaging points being designed for generating an image signal. In a step of combining, in each case a number of image signals corresponding to the number of imaging points per imaging element may be combined into a combined image signal.

Unlike an imager used heretofore, this allows use of an imager having a higher resolution, the resolution of the imager used heretofore once again being achieved by combining the image signals. This allows an imager used heretofore to be easily replaced by imagers corresponding to the approach according to the present invention.

According to one specific embodiment, a method for ascertaining color information of a light component recorded using an imager which includes at least two adjacent imaging elements of different color sensitivity includes the following steps:

generating an expanded light component corresponding to a method for controlling an incidence of light on an imager;

detecting the expanded light component using the two adjacent imaging elements of different color sensitivity, a first color sensitivity being associated with one of the adjacent imaging elements, and a second color sensitivity being associated with the other of the adjacent imaging elements; and comparing an intensity of a first image signal of the first imaging element to an intensity value of a second image signal of the second imaging element in order to ascertain the color information.

With knowledge of the color sensitivities of the associated imaging elements, the color of the light component detected by the at least two adjacent imaging elements may be easily and reliably deduced by comparing the image signals. For example, a color sensitivity to the color red may be assigned to the first imaging element, and a color sensitivity to the color white may be assigned to the second imaging element.

In this example, the "white" imaging element receives the unfiltered intensity. The "red" imaging element removes all light components (energy in the light signal) which are not red. If the first image signal and the second image signal are the same, i.e., represent equal values, this means that the "red" imaging element has removed no energy, and therefore the light signal must be red. If the values represented by the two image signals are different (white>red), this means that the red color filter of the "red" imaging element has "removed" energy from the light signal, which then no longer falls on the light-sensitive element. Therefore, the light was not red, but instead was white, for example.

A corresponding device may be provided which is designed for carrying out or implementing the steps of one or more of the mentioned methods in appropriate devices. The object underlying the present invention may also be quickly and efficiently achieved by this embodiment variant of the present invention in the form of a device.

By use of the described approach, an imager may advantageously be dispensed with, compared to an approach in which at least two imagers which are sensitive to different colors (for example, intensities of "colorless" and red) are used. A beam splitter splits the incident light into two parts, i.e., two optical paths, or, for example, a lens is present for each imager. The color intensities of the one imager may thus exactly offset the intensities of the second imager.

In principle, the light may be separated into two optical paths, one path being filtered and remixed with the second path. The filtering may, for example, involve removing all components except red and introducing additional blurring into this optical path.

When two optical paths are used, it should be ensured during the design and manufacture that the two paths are exactly aligned with one another. Using a single path may therefore be advantageous.

In addition, use may be made of an intentional color-selective blurring in order to achieve a greater depth of focus using a lens having a fixed focus. For this purpose, an optical element in the form of a lens may be characterized and designed in such a way that the various color channels have different focal ranges. A search may be made in a downstream imaging processing system for the color channel having the sharpest focus for a range. Since the characteristic of the lens is known, the other color channels may be offset in such a way that sharp imaging is possible here as well. The chromatic aberrations may thus be factored out for error-free sharp imaging.

DETAILED DESCRIPTION

Figure 1A:
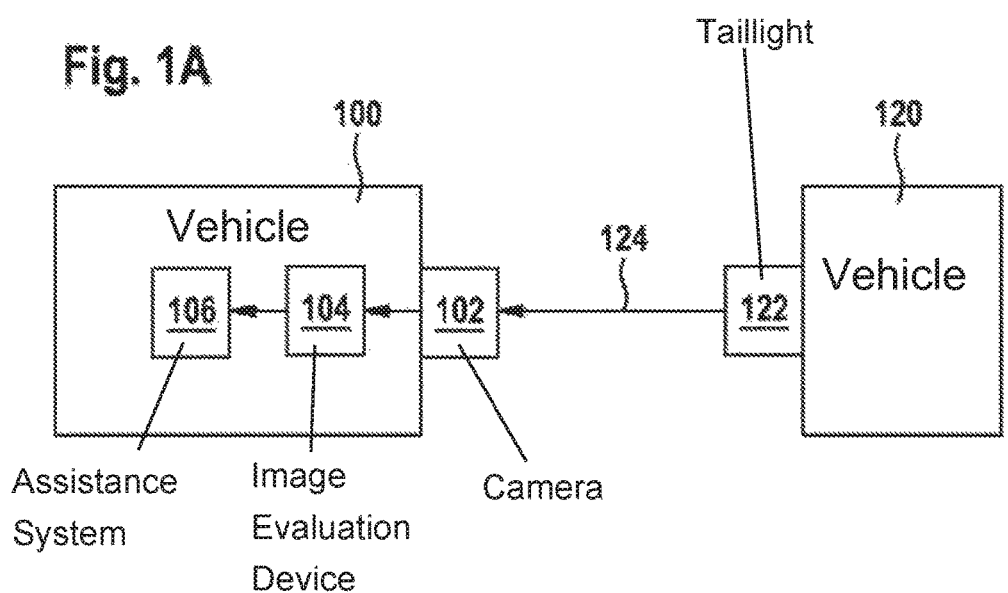
FIG. 1A shows a vehicle which includes a device according to one exemplary embodiment of the present invention.

In the following description of preferred exemplary embodiments of the present invention, identical or similar reference numerals are used for the elements having a similar action which are illustrated in the various figures, and a repeated description of these elements is dispensed with.

FIG. 1A shows a vehicle 100 which includes a device according to one exemplary embodiment of the present invention. Vehicle 100 includes a camera 102 which is designed for recording an image of surroundings of vehicle 100 and for outputting same to an image evaluation device 104. Image evaluation device 104 is designed for evaluating the image and outputting an evaluated piece of image information to an assistance system 106 of vehicle 100.

Another vehicle 120 is situated in the surroundings of vehicle 100. Other vehicle 120 includes a taillight 122 which is situated in the detection range of camera 102. Light 124 which is actively emitted or reflected by taillight 122 is detected by an imager of camera 102. Image evaluation device 104 is designed for recognizing taillight 122 as an illumination means of vehicle 120 and for recognizing a color of light 124. Based on the information that camera 102 has detected light 124 of a certain color of illumination means 122 of other vehicle 120, assistance system 106 may deduce that a rear view, not a front view, of other vehicle 120 has been recorded by camera 102.

In an assistance system 106 in the form of a high-beam assistant, various situations are classified in order to optimize the light distribution with respect to the recognized situation. The color of light source 122 which is recognized by camera 102 is important for a good situation classification, since an estimation of the travel direction of other vehicle 120 may thus be made.

However, when other vehicle 120 is very far away, it is not possible to make a clear distinction between a preceding and an oncoming vehicle 120 when light source 122 is imaged on exactly one pixel of an imager of camera 102. For the color reconstruction, at least colored light source 122, a red taillight, for example, must be imaged on at least two pixels of a different color or color filter.

Figure 1B:
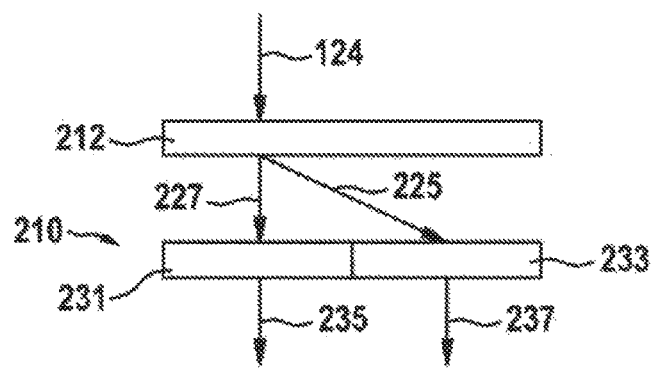
FIG. 1B shows a schematic illustration of a sensor according to one exemplary embodiment of the present invention.

FIG. 1B shows a sensor for detecting light according to one exemplary embodiment of the present invention. The sensor may be used, for example, as an image sensor in the camera shown in FIG. 1A. The sensor includes an imager 210 and an optical element 212. Imager 210 includes a first imaging element 231 and a second imaging element 233 adjacent to first imaging element 231. Optical element 212 is situated in front of imager 210 in a direction of incidence of a light beam 124. FIG. 1B schematically illustrates single light beam 124 which in the absence of optical element 212 would strike only a surface of imager 210 covered by first imaging element 231. Light beam 124 is split due to the presence of optical element 212. A first component 225 of light beam 124 is directed by optical element 212 in the direction of second imaging element 233 and is detected by second imaging element 233. A second component 227 of light beam 124 is either not influenced by optical element 212 or is passed through or guided to first imaging element 231. Second component 227 of light beam 124 is detected by first imaging element 231.

First imaging element 231 is designed for outputting a first image signal 235, which represents an intensity of component 227 of light beam 124 which is detected by first imaging element 231. Second imaging element 233 is designed for outputting a second image signal 237, which represents an intensity of first component 225 of light beam 124 which is detected by second imaging element 233.

Imager 210 may include a plurality of further first and second imaging elements, not shown in FIG. 1B, which may, for example, be arranged in alternation adjacent to shown imaging elements 231, 233.

Image signals 235, 237 may be received and further processed via a suitable interface, for example, by a device for ascertaining the color information of light beam 124 which is detected by the sensor. Such a device may, for example, be part of the image evaluation device shown in FIG. 1A. For this purpose, the device for ascertaining the color information may include a device for comparing an intensity value of first image signal 235 of first imaging element 231 to an intensity value of second image signal 237 of second imaging element 233. The color of light beam 124 may be deduced by making the comparison.

According to various exemplary embodiments, optical element 212 may be designed, for example, as a diffuser or a defocusing device, as a device for decoupling and coupling a component of light 124, or as a diffraction structure. Depending on the specific embodiment of optical element 212, imaging elements 231, 233, also referred to below as pixels, may be implemented with the same color sensitivity or with different color sensitivities.

Figure 2:
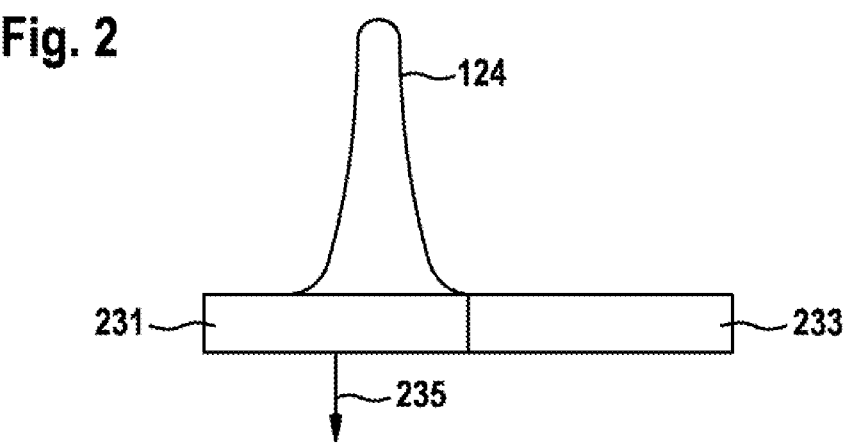
FIGS. 2 and 3 show schematic illustrations of a detail of an imager.
Figure 3:
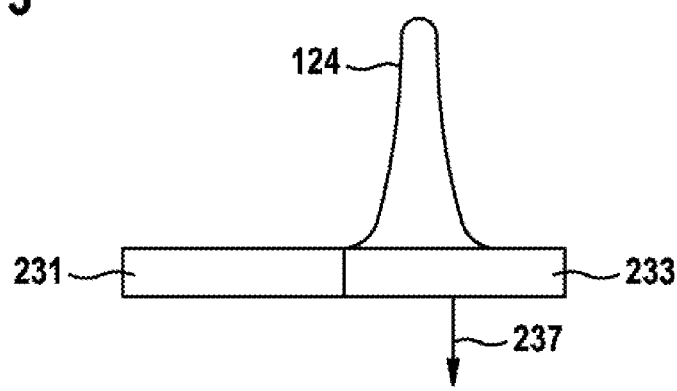

FIGS. 2 and 3 each show a schematic illustration of a detail of an imager of a camera. The imager includes a plurality of imaging elements 231, 233, also referred to below as pixels or pixel elements, which are situated next to one another in columns and rows. A first pixel 231 and a second pixel 233, which may correspond to the imaging elements described with reference to FIG. 1B, are shown as an example. First pixel 231 is a "white" intensity pixel, and second pixel 233 is a red pixel. First pixel 231 is designed for detecting the intensity of white light or of spectral colors contained in white light. Second pixel 233 is designed for detecting the intensity of red light.

In FIG. 2, first pixel 231 is illuminated by light 124 which may be emitted, for example, by the taillight of the other vehicle shown in FIG. 1A. In this case, first pixel 231 outputs a first image signal 235 which represents an intensity of light 124. First image signal 235 is associated with the color white due to the color sensitivity of first pixel 231. However, first image signal 235 is also output when light 124 is white light, as well as when light 124 is red light.

In FIG. 3, second pixel 233 is illuminated by light 124 which may be emitted, for example, by the taillight of the other vehicle shown in FIG. 1A. In this case, second pixel 233 outputs a second image signal 237 which represents an intensity of light 124. Second image signal 237 is associated with the color red due to the color sensitivity of second pixel 233. However, second image signal 237 is also output when light 124 is white light, as well as when light 124 is red light.

If light 124 in the form of a narrow peak, which is red here, for example, as from a distant taillight, falls on only one of pixels 231, 233, as illustrated in FIGS. 2 and 3, a color reconstruction is no longer possible.

The exemplary embodiment shown in FIGS. 2 and 3 may also relate to video cameras in the automotive field, which usually have pixels 231 in the form of "gray"/"white" intensity pixels and pixels 233 in the form of red pixels. Pixels 233 correspond to the "white" intensity pixels, certain spectral components of incident light 124 being filtered out in such a way that only the red component remains.

Pixels 231 used as intensity pixels or white pixels, and pixels 233 used as red pixels, are utilized, among other things, for distinguishing taillights (red) from headlights (white). Red taillights generate the same intensity ("gray scale") on a red pixel 233 as on an unfiltered white pixel 231. Headlights generate a much higher intensity on a pixel 231 used as a white pixel than on a pixel 233 used as a red pixel, since in pixel 231 used as a red pixel, the non-red components, which have been measured along with pixel 233 used as a white pixel, have been filtered out. A limited color reconstruction is possible using "multicolored" pixels 231, 233. The more "multicolored" pixels 231, 233 which are present in the camera, the better the actual color may be reconstructed. For example, digital cameras in the consumer sector have the pixel combination red, 2× green, and blue.

Lights such as headlight or taillights which are far away are frequently imaged on only a single pixel of pixels 231, 233 due to the limited size. When only one of pixels 231, 233, i.e., either a pixel 231 used as a red pixel or a pixel 233 used as a white pixel, is illuminated, it is not possible to conclude whether a headlight (white) or a taillight (red) is involved, since the difference in brightness between "white" and "red" cannot be measured due to the fact that only one color is always present. A conclusion as to whether a preceding (red) or oncoming vehicle (white) is involved is then no longer possible.

Figure 4:
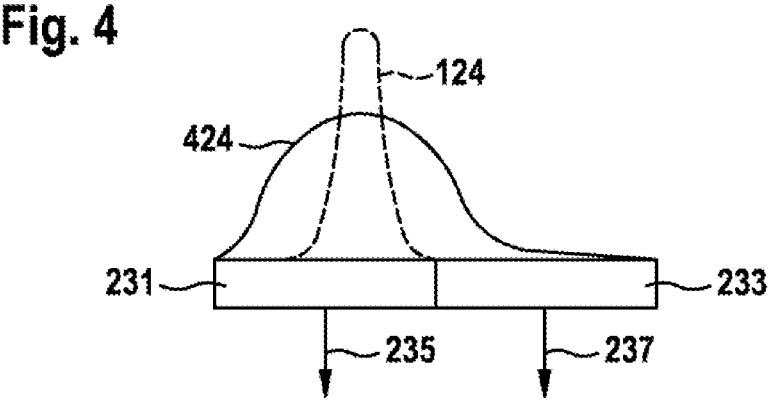
FIGS. 4 and 5 show schematic illustrations of a detail of an imager according to one exemplary embodiment of the present invention.
Figure 5:
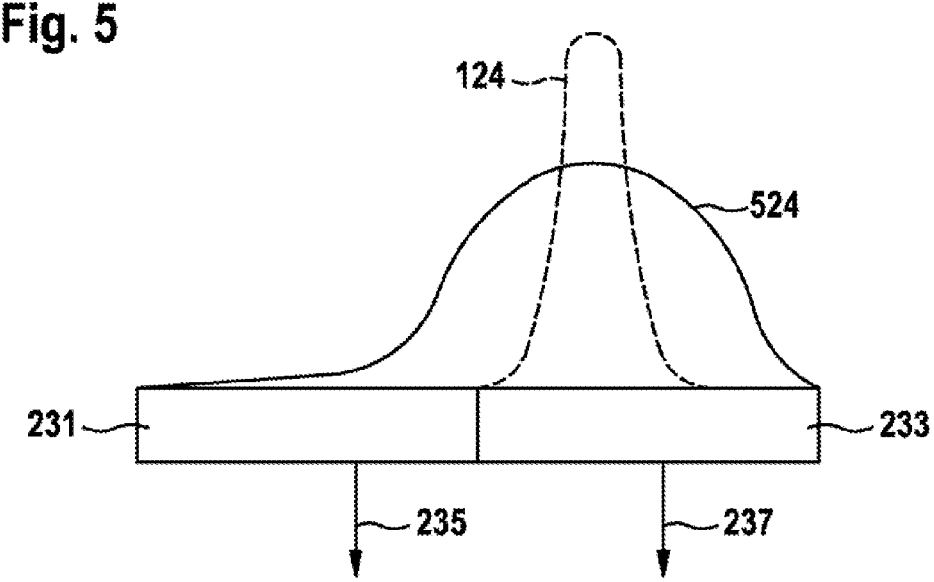

FIGS. 4 and 5 in each case show a schematic illustration of a detail of an imager of a camera according to one exemplary embodiment of the present invention. This may be an imager of the camera shown in FIG. 1A. As described with reference to FIGS. 2 and 3, the imager includes a plurality of pixels, of which a first pixel 231 and a second pixel 233 are shown as an example. First pixel 231 is a "white" intensity pixel, and second pixel 233 is a red pixel.

Incident light 124, previously described with reference to FIGS. 2 and 3, is illustrated by dashed lines. However, according to the exemplary embodiments described with reference to FIGS. 4 and 5, incident light 124 is expanded before it strikes pixels 231, 233, so that in each case it illuminates not just a single pixel of pixels 231, 233, but, rather, as expanded light 424, 524, illuminates both pixels 231, 233. According to this exemplary embodiment, the expansion is achieved by one or multiple optical elements which are situated in the beam path of incident light 124. Light 124 is thus expanded by one or multiple optical elements in such a way that a first component of light 124 falls on one of pixels 231, 233, and a second component of light 124 falls on the other of pixels 231, 233. The optical element may be the optical element described with reference to FIG. 1A.

Due to incident light 124, which without expansion would either fall only on first pixel 231 or only on second pixel 233, falling on both pixels 231, 233, a reconstruction of the color of incident light 124 is possible. In the exemplary embodiment shown in FIGS. 4 and 5, incident light 124, and thus also expanded light 424, 524, has a red color. In this case, either first image signal 234 and second image signal 237 show approximately the same intensity, as shown in FIG. 4, or second image signal 237 shows a higher intensity, as shown in FIG. 5.

In contrast, if incident light 124 were white, in each case first image signal 235 would have a higher intensity.

Thus, a color of incident light 124 may be deduced by comparing the values of image signals 235, 237.

The optical element used may be a diffuser. Use of the diffuser allows an improvement in the color reconstruction for light received from headlights or taillights. The diffuser may be designed as a selective diffuser. In this regard, "selective" may relate to a certain color component.

According to one exemplary embodiment, a color reconstruction of light 124 shown in FIGS. 4 and 5 is made possible by an optical element for truncating high-frequency components, which may be referred to as "blurring." Optical elements remove all frequency components which are above a certain threshold. This corresponds to a soft focus. Narrow light points are thus imaged on at least one white pixel 231 and one red pixel 233, thus making a color reconstruction possible. The light points, i.e., headlights, in reality must have a minimum size, and may have only a certain minimum spacing for which the imaging rule is valid.

Truncating the high frequencies may take place in various ways. One exemplary embodiment is based on use of a diffuser. According to another exemplary embodiment, an imaging equation for imaging a real object on an image is systematically violated so that blurred imaging takes place. This corresponds to defocusing.

Figure 6:
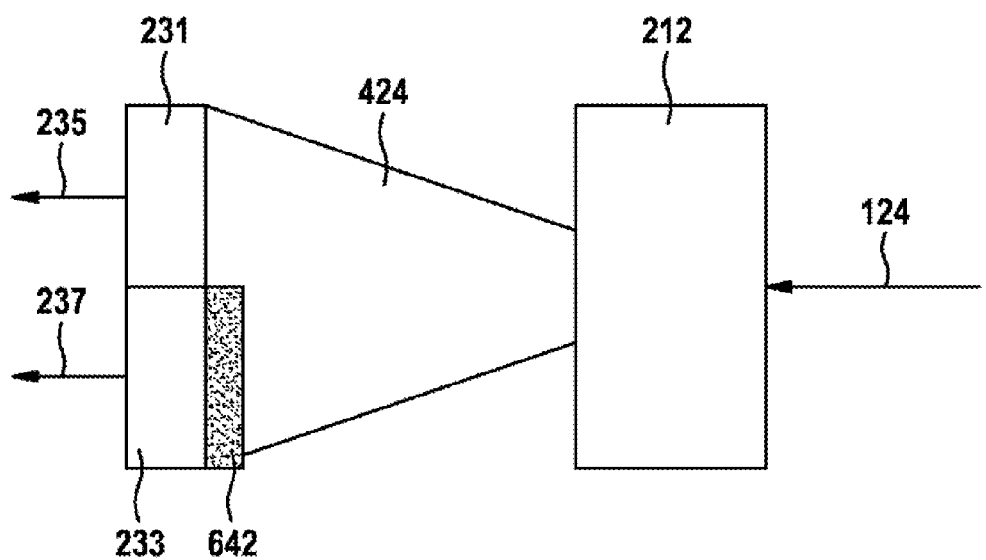
FIG. 6 shows a schematic illustration of an imaging device according to one exemplary embodiment of the present invention.

FIG. 6 shows a schematic illustration of an imaging device according to one exemplary embodiment of the present invention. The imaging device may be part of the camera shown in FIG. 1A. The imaging device is designed for converting incident light 124 into electrical image signals 335, 337.

The imaging device includes an imager which has a field composed of a plurality of pixels, of which in particular the two pixels 231, 233 previously described with reference to FIGS. 2 through 5 are shown in detail. The imaging device includes at least one optical element 212 which is situated in a beam path of incident light 124. Optical element 212 is designed for dividing incident light 124 between the two pixels 231, 233. For example, a diffuser or a device for generating a defocused image is thus present in the optical path of the imaging device.

Each of pixels 231, 233 is designed for outputting an image signal 235, 237 as a function of an intensity and color of light 424, which is expanded and guided to pixels 231, 233 by optical element 212. Image signals 235, 237 may be evaluated, for example, by the evaluation device shown in FIG. 1A. According to this exemplary embodiment, pixel 233 has a filter 642 which filters out certain spectral components from expanded light 424, so that only a red component of expanded light 424 strikes an optical sensor surface of pixel 233.

According to one exemplary embodiment of the present invention, incident light 124 in the form of peaks is made wide enough up to a certain extent so that it may be detected by at least two adjacently situated pixels.

The blurring which appears in the image according to exemplary embodiments of the present invention may be reduced by utilizing an imaging device in the form of an imager having a fairly high resolution, subsequent color reconstruction, and binning to the current "original" resolution. Binning may be understood as the combination of adjacent image elements in the sensor into pixel blocks. A higher degree of light sensitivity of the camera may thus be achieved, although in return, the resolution power is reduced, depending on the number of image elements which are combined.

According to one exemplary embodiment, color-specific blurring may be produced by using an optical element 212 or multiple optical elements 212. Thus, for example, it is possible to image only the red component in light 124 in a blurred manner. The color-specific blurred imaging may be advantageous in the relatively low-level scanning of the red component in the image for an R3I imager. In an R3I imager, three intensity pixels (I; "white") and one red pixel (R; "red") are present per 4 pixels (normally a 2×2 pixel block). This would be possible, for example, by decoupling light components into a second optical path in which the red component, for example, is blurred, using a diffuser or defocusing, for example, and subsequently recoupling the light components. According to one exemplary embodiment, the coupling and decoupling of light components takes place via one or multiple semitransparent mirrors. Thus, optical element 212 may include, for example, a device for decoupling light components of light 124 into a second optical path, and a device for expanding the decoupled light component.

Figure 7:
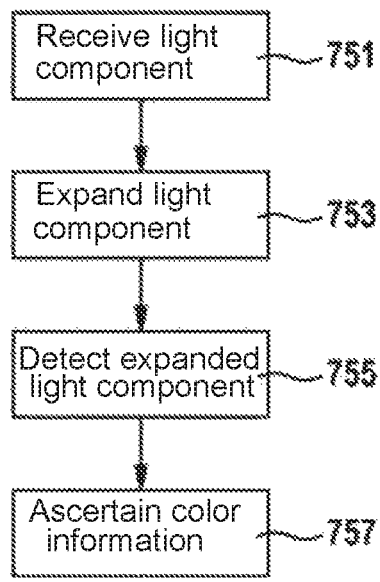
FIG. 7 shows a flow chart of a method for ascertaining color information according to one exemplary embodiment of the present invention.

FIG. 7 shows a flow chart of a method for ascertaining color information of a light component, recorded using an imager which includes at least two adjacent imaging elements of different color sensitivity, according to one exemplary embodiment of the present invention. The method may be carried out, for example, in the devices described with reference to FIG. 1A. The imager may be the imager shown in FIG. 1B.

Receiving a light component which includes a piece of light information about a light source, for example the taillight shown in FIG. 1A, takes place in a step 751. The light component is expanded in a step 753, for example to the adjacent pixels shown in FIGS. 2 through 6. Detecting the expanded light component takes place in a step 755, for example using the adjacent pixels shown in FIGS. 2 through 6, each of the pixels generating an electrical image signal. Values of the generated image signals are compared to one another in a step 757 in order to ascertain the color information.

Exemplary embodiments of the present invention are described with reference to FIGS. 8 through 12, in which optical effects for an improved color reconstruction are used. A color-selective sharpness limitation may be used with only one optical path. The optical properties of diffraction and refraction may be utilized for this purpose.

Figure 8:
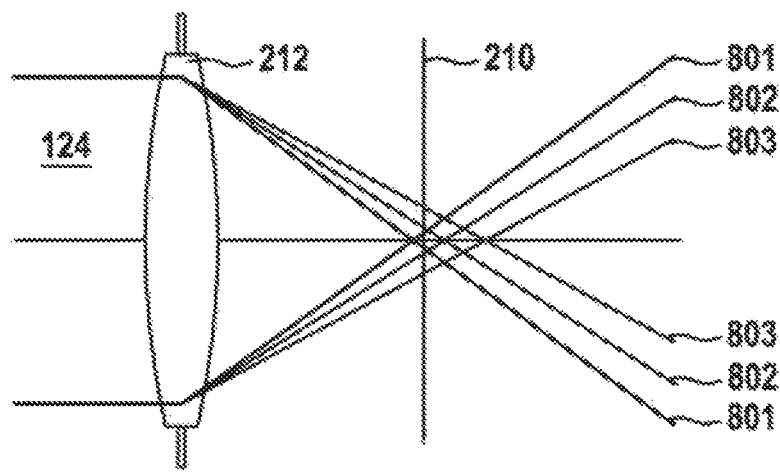
FIG. 8 shows an illustration of a color-selective refraction or chromatic aberration based on one exemplary embodiment of the present invention.

FIG. 8 illustrates the color-selective refraction or chromatic aberration with reference to an optical element 212 and an imager 210 according to one exemplary embodiment of the present invention. Incident light 124 is refracted to different degrees on optical element 212, which in the present case is implemented in the form of a lens, as a function of the color or wavelength of the light. Materials such as the material of optical element 212 have the properties of refracting various wavelengths (colors of light) to different degrees. This is utilized, for example, in the dispersion prism in order to refract white light into its components. White light is refracted into a rainbow or into rainbow colors. Shortwave light (blue) 801 is refracted more strongly than green light 802, which in turn is refracted more strongly than longwave light (red) 803, which results in different focal points, and therefore focal ranges, depending on color 801, 803, 802. FIG. 8 schematically shows the effect of different focal points as a function of color of light 801, 802, 803.

In the design of optical elements, it would be desirable to routinely completely remove this effect, since it results in color fringes in the image. The color error is generally known as "chromatic aberration." By selecting and combining suitable materials, which are sometimes costly, optical systems are developed which have virtually no chromatic aberration.

According to exemplary embodiments of the present invention, use may advantageously be made of the chromatic aberration in order to produce color-dependent blurring on imager 210, and thus to improve the color reconstruction which is necessary for the situation recognition, using an optical path. For this purpose, lens 212 is situated in such a way that, for example, the green-blue range (maximum of the brightness sensitivity in the mesopic/scotopic range) is sharply imaged on imager 210. The image of the red range is situated behind imager 210, which results in blurring on imager 210. The color reconstruction may be improved by the blurring in the red range which is thus achieved, since, for example, two imaging elements of imager 210 are illuminated by the red taillights of a vehicle.

Thus, use may intentionally be made of color channel-dependent blurring in order to improve the color reconstruction. Sharp imaging into "infinity" is not necessary, since in this case the relevance of the information compared to the near range is low in driver assistance systems.

Figure 9:
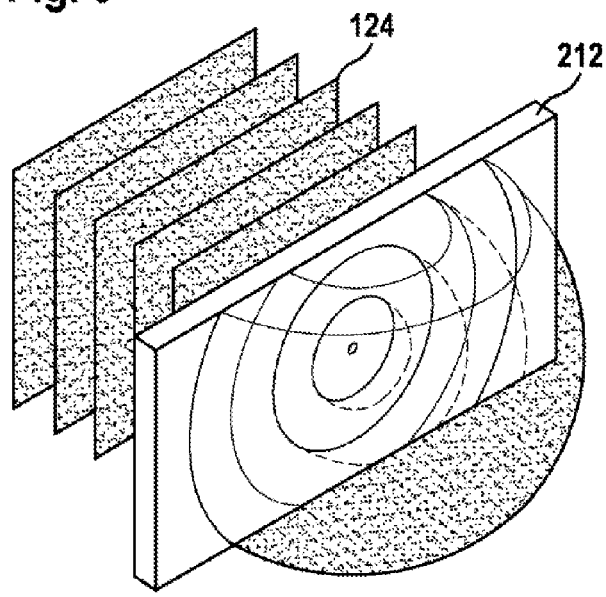
FIG. 9 shows an illustration of a color-selective diffraction based on one exemplary embodiment of the present invention.

FIG. 9 illustrates the color-selective diffraction with reference to an optical element 212 according to one exemplary embodiment of the present invention. Optical element 212 is designed as a perforated plate in the present case. Spherical waves arise behind the hole when the hole diameter is much smaller than the wavelength of incident light 124.

The laws of geometric optics can no longer be applied in the diffraction, since the axiom that light beams 124 propagate linearly in space is no longer valid. Light beams 124 are diffracted at openings, and thus partially reach areas which in fact must be shaded.

This is described by the Huygens-Fresnel principle. If the hole diameter is within an order of magnitude of the wavelength, the effect is no longer negligible. The diffraction of light 124 is dependent on the wavelength. Thus, for example, longwave light (red) is diffracted more strongly than shortwave light (blue). Stated in another way, red light beams are expanded to a greater degree than blue light beams.

Figure 10:
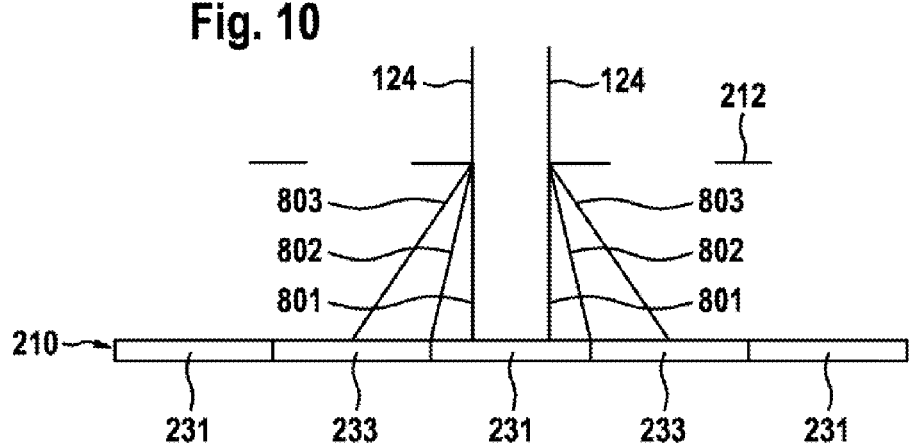
FIG. 10 shows a schematic illustration of a sensor according to one exemplary embodiment of the present invention.

FIG. 10 shows a schematic illustration of a sensor according to one exemplary embodiment of the present invention.

The sensor includes an imaging device 210 in the form of an imager. Five imaging elements 231, 233 of imager 210 are shown as an example. Three imaging elements 231 which function as intensity pixels and two imaging elements 233 which function as red pixels are shown. The different types of imaging elements 231, 233 are arranged in alternation in the plane of imager 210.

The sensor includes an optical element 212 in the form of a diffraction grating which is situated at a distance from imaging elements 231, 233, in particular, in front of imaging elements 231, 233 with respect to a direction of incidence of light 124 on imaging elements 231, 233. A light-permeable material such as a glass layer may be situated between the diffraction grating of optical element 112 and light-sensitive surfaces of imaging elements 231, 233. According to this exemplary embodiment, diffraction elements of diffraction grating 212 are situated in each case at the level of a transition between two adjacent imaging elements 231, 233. Thus, the edges of imaging elements 231, 233 are each covered by diffraction grating 212, whereas the central surface of imaging elements 231, 233 is not. Central surfaces of imaging elements 231, 233 are thus situated in each case at the level of recesses within diffraction grating 112 which are permeable to light 124.

A light beam 124 is directed toward a middle imaging element of imaging elements 231. Light beam 124 strikes a recess in diffraction grating 212 opposite from a middle imaging element of imaging elements 231. As schematically illustrated in FIG. 10, a red color component 803 of light beam 124 incident in the direction of first imaging element 231, situated at the edge of light beam 124, is strongly diffracted and thus deflected onto adjacent imaging elements 233. A green color component 802 of light beam 124 incident in the direction of first imaging element 231, situated at the edge of light beam 124, is diffracted less strongly than red color component 803, and is thus deflected onto the boundary between the middle imaging element of imaging elements 231 and adjacent imaging elements 233. In contrast, a blue color component 801 situated at the edge of light beam 124 is not diffracted or is diffracted only slightly, and therefore falls on the middle imaging element of imaging elements 231.

Optical elements 212 in the form of diffraction gratings and diffractive elements make use of the physical effect of diffraction. A diffraction grating 212 may be understood to mean a perforated element which diffracts light 124 passing through. If an optical element 212 for the diffraction is brought into the beam path, light 124 is expanded as a function of the color, and thus blurred. By use of optical element 212 in the form of a diffraction grating, it is thus possible to blur red color component 803 more intensely than blue component 801 in the same optical path. An improved color reconstruction is thus possible.

Depending on the type of diffraction grating 212, a large component of light 124, for example 50%, is "swallowed" by grating 212. Gratings 212 have the advantage that in principle, grating 212 may be used as a fastening material. However, the principle applies that the same effects are retained when the pattern of diffraction grating 212 is "inverted." For example, instead of a gap at which light 124 is diffracted, the same diffraction effects may take place, for example, on a wire having the same thickness.

Therefore, a point structure may advantageously also be mounted as an optical element 212 instead of a grating 212 in order to allow more light 124 on imager 210. The point structure of optical element 212 may be based on the structure of imager 210, so that, for example, only imaging elements 233 in the form of red pixels are situated behind the points of optical element 212, and light 124 falls on imager 210 due to diffraction or between individual imaging elements 231, 233 in order to obtain a uniform distribution due to the diffraction.

If imaging elements 233 corresponding to the red pixels are arranged in a line, a simple linear structure of optical element 212 may also be provided in order to bring even more of light 124 to the imager.

Figure 11:
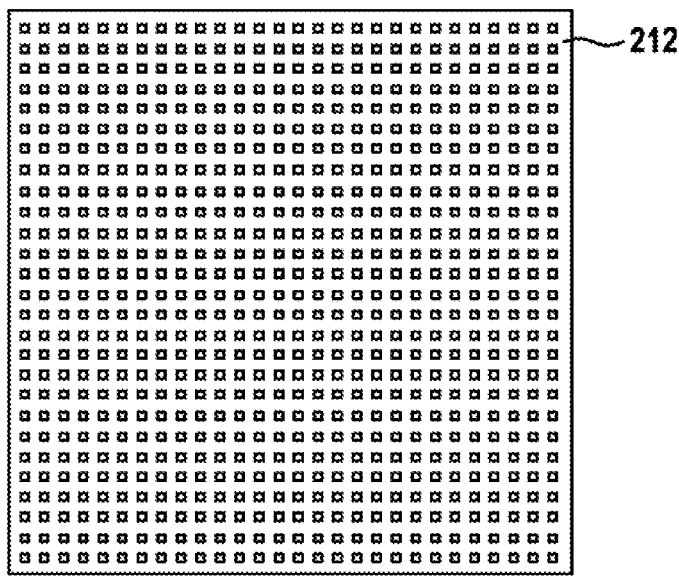
FIG. 11 shows an optical element according to one exemplary embodiment of the present invention.
Figure 12:
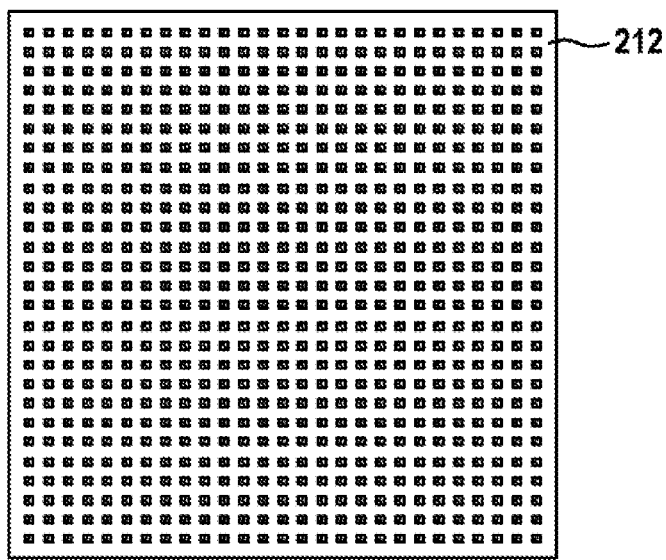
FIG. 12 shows an optical element according to one exemplary embodiment of the present invention.

Possible diffraction structures of an optical element 212, which may be used, for example, instead of the diffraction grating shown in FIG. 10, are shown with reference to FIGS. 11 and 12.

FIG. 11 shows a use of a point structure as an optical element 212 according to one exemplary embodiment of the present invention. Optical element 212 is designed as a layer provided with through holes, similar to a diffraction grating.

FIG. 12 shows a use of a point structure as an optical element 212 according to another exemplary embodiment of the present invention. Optical element 212 is designed as a point structure. The points forming the optical element may be situated, for example, on a surface of a light-permeable layer which may be situated on a surface of the imager.

Figure 13:
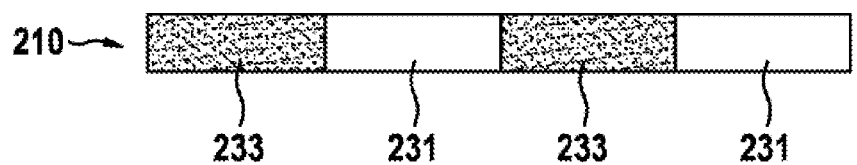
FIG. 13 shows an imager according to one exemplary embodiment of the present invention.

FIG. 13 shows an imager 210 according to one exemplary embodiment of the present invention. Four imaging elements 231, 233 of imager 210 are shown as an example. Two imaging elements 231 which function as intensity pixels and two imaging elements 233 which function as red pixels are shown. The different types of imaging elements 231, 233 are arranged in alternation in the plane of imager 210. According to this exemplary embodiment, an implementation of imager 210 is carried out in such a way that color filters are situated in the substrate of imaging elements 233. For example, a sensitivity of the material of imaging elements 233 to light of a red color may be achieved by doping. Imager 210 is thus designed in such a way that color filters are implemented in the semiconductor substrate itself, for example by doping.

Figure 14:
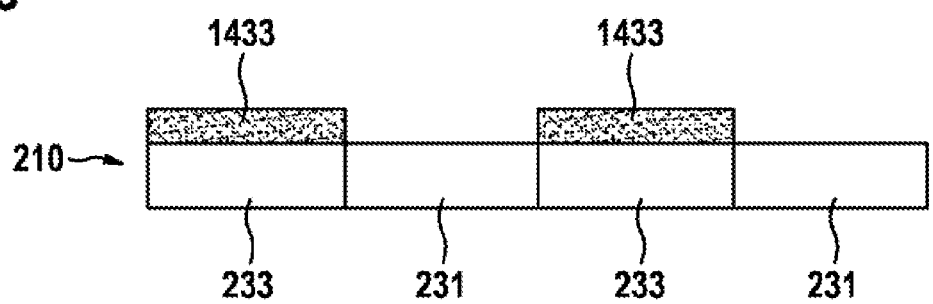
FIG. 14 shows an imager according to one exemplary embodiment of the present invention.

FIG. 14 shows an imager 210 according to one exemplary embodiment of the present invention. Four imaging elements 231, 233 of imager 210 are shown as an example. Two imaging elements 231 which function as intensity pixels and two imaging elements 233 which function as red pixels are shown. The different types of imaging elements 231, 233 are arranged in alternation in the plane of imager 210. According to this exemplary embodiment, an implementation of imager 210 is carried out in such a way that imaging elements 233 are implemented by mounting color filters 1433 as color pixels. Imager 210 is thus designed in such a way that color filters 1433 are mounted on the semiconductor substrate of imager 210, to which the light-sensitive surfaces of imaging elements 233 are applied.

Imagers 210 shown in FIGS. 13 and 14 may be used, for example, for a camera as shown in FIG. 1. In addition, imagers 210 may be used for sensors for detecting light, as described with reference to the exemplary embodiments.

Figure 15:
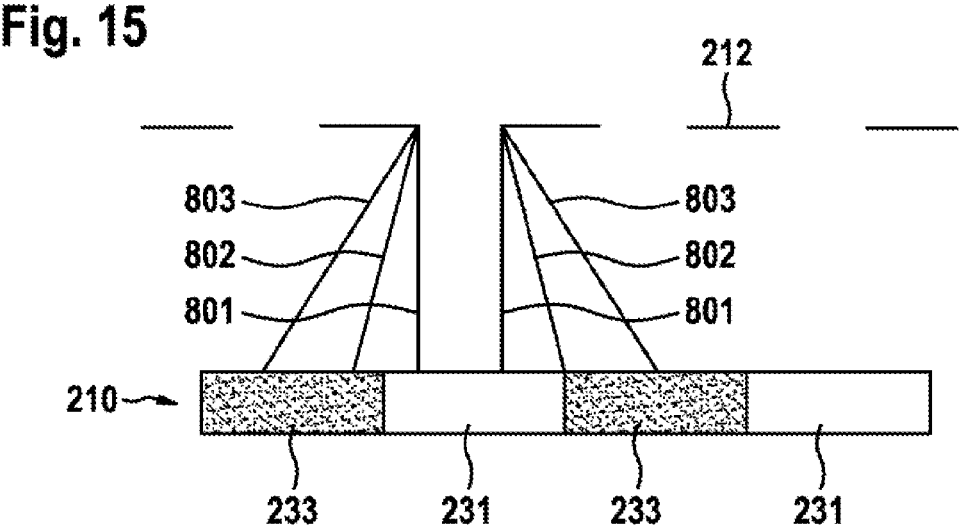
FIG. 15 shows a schematic illustration of a sensor according to one exemplary embodiment of the present invention.

FIG. 15 shows a schematic illustration of a sensor according to one exemplary embodiment of the present invention.

The sensor includes an imaging device 210 in the form of an imager. Four imaging elements 231, 233 of imager 210 are shown as an example. The imager may be designed as described with reference to FIGS. 13 and 14.

The sensor includes an optical element 212 in the form of a diffraction grating which is situated at a distance from imaging elements 231, 233, in particular, in front of imaging elements 231, 233 with respect to a direction of incidence of light 124 on imaging elements 231, 233. A portion of the incident light is diffracted by the diffraction grating, as described with reference to FIG. 10.

With reference to FIG. 15, the case is schematically illustrated in which a light beam incident on diffraction grating 212 is directed solely onto one of imaging elements 231. Due to the diffraction at diffraction grating 212, a portion of the incident light beam, in particular a red component 803 of the light beam, is still guided to adjacent imaging elements 233.

Due to using diffraction grating 212 to produce color-selective blurring, (more) red light 803 falls on imaging elements 233, which function as red imagers, than is possible without diffraction grating 212 when the light source is imaged on exactly one imaging element 231 which functions as an intensity pixel, as illustrated in FIG. 15. A precise alignment of diffraction grating 212 with the pixel pattern, i.e., the pattern of the arrangement of imaging elements 231, 233, is necessary in order to make good use of the effect. Thus, a precise alignment of diffraction grating 212 with pixels 231, 233 is necessary.

Figure 16:
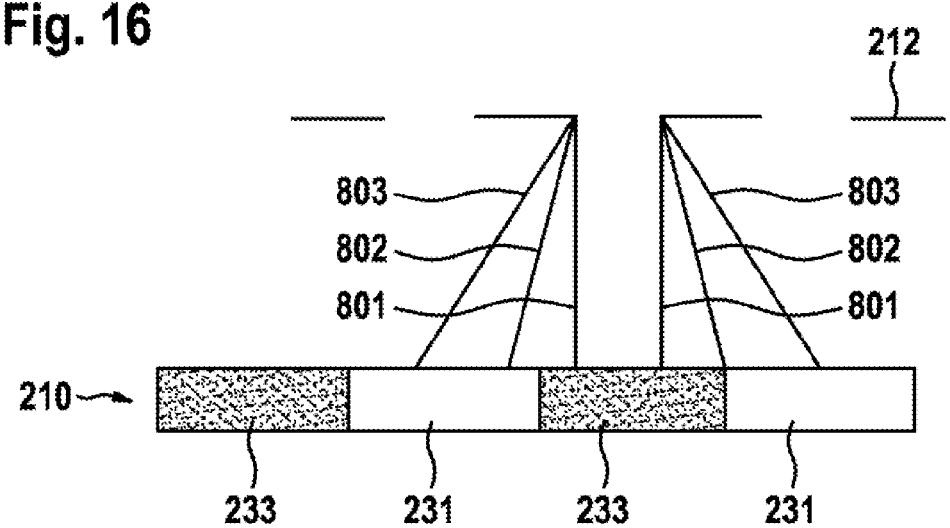
FIG. 16 shows a schematic illustration of a sensor according to one exemplary embodiment of the present invention.

FIG. 16 shows a schematic illustration of a sensor according to one exemplary embodiment of the present invention.

The sensor includes an imaging device 210 in the form of an imager. Four imaging elements 231, 233 of imager 210 are shown as an example. The imager may be designed as described with reference to FIGS. 13 and 14.

The sensor includes an optical element 212 in the form of a diffraction grating which is situated at a distance from imaging elements 231, 233, in particular, in front of imaging elements 231, 233 with respect to a direction of incidence of light 124 on imaging elements 231, 233. A portion of the incident light is diffracted by the diffraction grating, as described with reference to FIG. 10.

With reference to FIG. 16, the case is schematically illustrated in which a light beam incident on diffraction grating 212 is directed solely onto one of imaging elements 233. Due to the diffraction at diffraction grating 212, a portion of the incident light beam, in particular a red component 803 of the light beam, is still guided to adjacent imaging elements 231.

With reference to FIGS. 15 and 16, a standard position of diffraction grating 212, shown in FIG. 15, and a shifted configuration of diffraction grating 212, shown in FIG. 16, are described below.

Aligning diffraction grating 212 with the color filters, i.e., imaging elements 233, is very exacting. A less than ideal alignment of diffraction grating 212 may result in less satisfactory utilization of diffraction grating 212. Thus, a completely different characteristic of the image recorded by imager 212 may result when diffraction grating 212 is shifted by one pixel 231, 233.

A color reconstruction of red light is possible in principle in the two configurations shown in FIGS. 15 and 16, since the red light is distributed over multiple pixels 231, 233. In the exemplary embodiment shown in FIG. 15, a pixel 231 which functions as an intensity pixel as well as adjacent pixels 233 which function as red pixels are illuminated. Pixel 231 which functions as an intensity pixel is illuminated most intensely, and pixels 233 which function as red pixels are illuminated somewhat less intensely. FIG. 16 illustrates a shifted configuration in which red pixel 233 is illuminated more intensely than intensity pixels 231. A color reconstruction with red light is thus more difficult, since less light energy has fallen on intensity pixels 231 than on red pixel 233. However, this may be back-calculated using suitable models.

In the configuration shown in FIG. 15, a bluish light source such as a xenon or LED headlight is sharply imaged on intensity pixel 231, and a very small portion of the longer wavelength light falls on red pixels 233. The light source is recognized as white or bluish. In the shifted configuration shown in FIG. 16, the bluish light falls on red pixel 233 and is filtered out. Small reddish component 803 is refracted onto intensity pixels 231. Thus, very little light energy reaches imager 210; in the image recorded by imager 210, this energy is visible as a dark light source. This effect may be avoided by precisely coordinating diffraction grating 212 with pixels 210.

Figure 17:
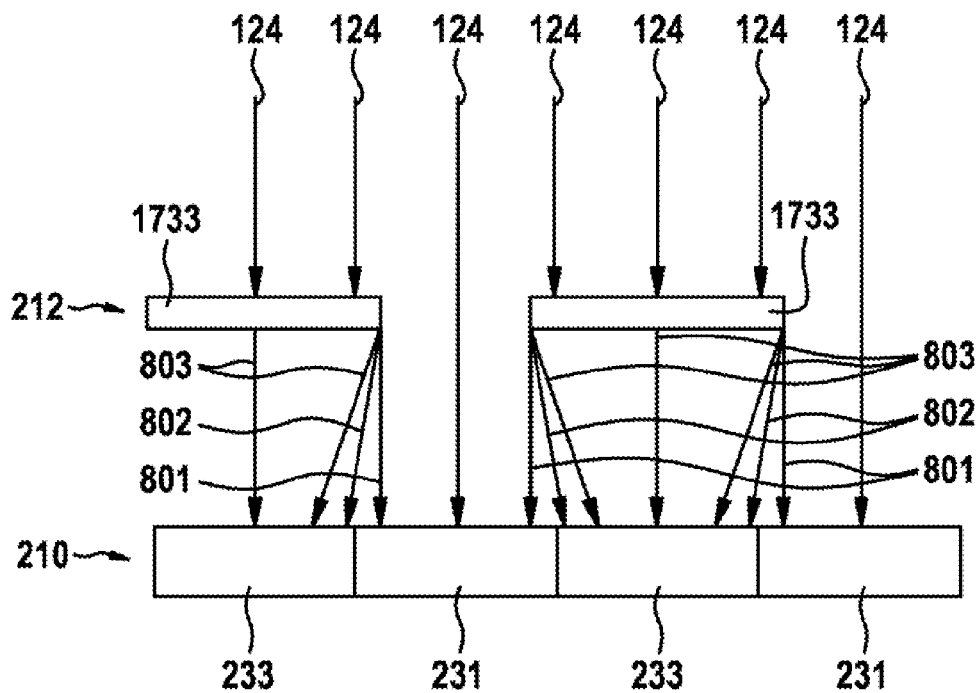
FIG. 17 shows a schematic illustration of a sensor according to one exemplary embodiment of the present invention.

FIG. 17 shows a schematic illustration of a sensor according to one exemplary embodiment of the present invention. The sensor includes an imager 210 and a diffraction grating 212 having a color filter functionality. Imager 210 includes a plurality of adjacently situated imaging elements 231, 233. Imaging elements 231, 233 all have the structural design of intensity pixels; a functional distinction between imaging elements 231 which function as intensity pixels and imaging elements 233 which function as red pixels is made by using diffraction grating 212 having a color filter functionality. A substrate of imager 210 may thus be implemented without an integrated color filter and without color filters being situated on the surface of the substrate. Those imaging elements 231, 233, having the same structural design, which are situated behind (with respect to incident light 124) diffraction element 1733 of diffraction grating 212, which is designed as a color filter, are assigned, due to the color filter functionality of diffraction elements 1733 of diffraction grating 212, as imaging elements 233 which function as red pixels.

FIG. 17 shows four adjacently situated imaging elements 231, 233 having the same design. A colored diffraction element 1733 of colored diffraction grating 212 is illustrated above and at a distance from imaging element 233 illustrated at the left. According to this exemplary embodiment, diffraction grating 212 is designed in such a way that light 124 incident on diffraction element 1733 is filtered, and only a certain color component of light 124, in the present case red component 803 of light 124, for example, is able to pass through diffraction element 1733 and fall on imaging element 233 behind same with respect to the direction of incidence of light 124. An edge of diffraction element 1733 is situated at the level of a boundary between imaging element 233 and adjacent imaging element 231. According to this exemplary embodiment, the diffraction element extends beyond the edge between imaging element 233 and adjacent imaging element 231, and thus slightly overlaps adjacent imaging element 231. Light 124 striking the edge of diffraction element 1733 is diffracted as a function of the color. A longer wavelength red component 803 of light 124 is diffracted more strongly than a shorter wavelength blue component 801 of light 124. A green component 802 of light 124 situated in between with respect to the wavelength is diffracted less strongly than red component 803, and more strongly than blue component 801. Thus, a portion of light 124 which would strike imaging element 231 without the presence of diffraction grating 212 is deflected onto adjacent imaging element 233. No diffraction element 1733 of diffraction grating 212, or alternatively, an element in between which is completely or partially transparent to light 124, is situated opposite from a central area of imaging element 231. Light 124 which is directed onto the central area of imaging element 231 may thus directly strike imaging element 231. The statements made for the two imaging elements 231, 233 shown at the left in FIG. 17 likewise apply to the two imaging elements 231, 233 shown at the right in FIG. 17. The diffraction grating may have a shape as described with reference to one of the preceding exemplary embodiments.

Diffraction elements 1733, of which two are shown in FIG. 17, may be applied to a carrier layer, which in turn is or may be situated on a surface of imaging elements 231, 233. The carrier layer may be a layer, made of glass or plastic, for example, which is transparent to light 124. A thickness of the carrier layer may be selected in such a way that a red component 803 of light 124 which actually falls on imaging element 231 may be deflected up to a detection range of adjacent imaging element 233 due to the diffraction at diffraction grating 212.

An improved color reconstruction of an image detected by imager 210 and a higher intensity due to diffraction may be achieved by making use of a colored diffraction grating 212, whereby the requirements for accuracy with regard to the positioning of imager 210 and diffraction grating may be greatly reduced. A recognition of and response to the presence of a road user is simplified for use for an assistance system of a vehicle.

According to the exemplary embodiment shown in FIG. 17, imager 210 includes only imaging elements 231, 233, which are constructively designed as intensity pixels; the color filtering is taken over by diffraction grating 212. The design is similar to that of an imager shown in FIG. 15, except that diffraction elements 1733 which are used as a color filter are situated at a distance from the light-sensitive surface of their respective associated imaging elements 233. At the same time, diffraction elements 1733 which are used as a color filter take over the function of diffraction grating 212.

In other words, FIG. 17 shows an imager 210 which in principle includes only intensity pixels 231, 233. Diffraction grating 212 is transparent to a color, such as red, or cyan, which is the complementary color of red, at the locations at which conventional diffraction gratings are not transparent.

The functionality of color filtering and light diffraction for color reconstruction are combined due to colored diffraction grating 212, as the result of which adjustment problems no longer arise. Color filter 1733, which takes over the function of diffraction grating 212, may, for example, be jointly mounted on a glass substrate. It is not important whether a pixel 231, 233 is situated farther to the left or right in diffraction grating 212.

In particular for two-colored or multicolored filters 1733, the approach provided here offers advantages, since diffraction grating 212 and color filters 1733 are fixedly connected to one another. Completely opaque (classical) grating parts (or grating points) may be combined with color filters 1733 in order to optimize the functionality of filters 1733 and diffraction gratings 212.

In addition, imager 210 may be manufactured more easily, since only pixels 231, 233 constructively designed as intensity pixels are necessary. The manufacturing steps for mounting color filters may be dispensed with during the manufacture of imager 210. These manufacturing steps may be combined with diffraction grating 212 in a cost-neutral manner, so to speak, but with functional advantages.

Figure 18:
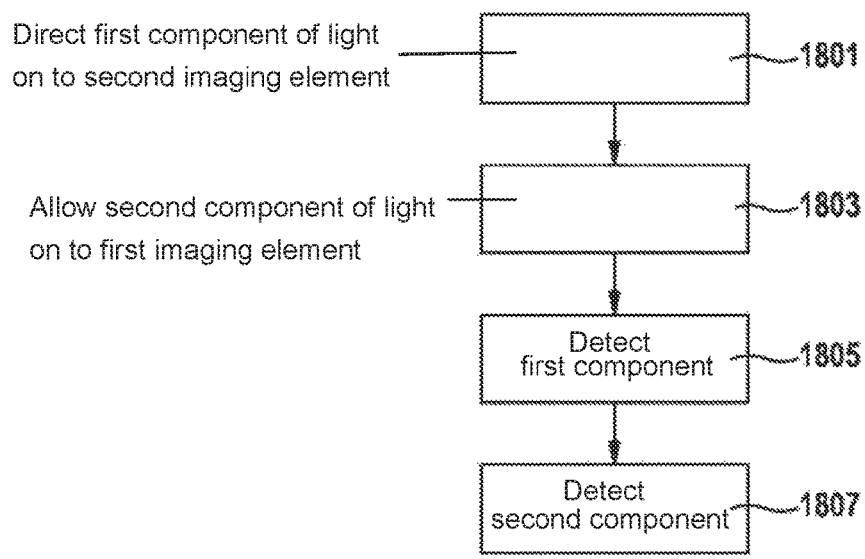
FIG. 18 shows a flow chart of a method for detecting light according to one exemplary embodiment of the present invention.

FIG. 18 shows a method for detecting light according to one exemplary embodiment of the present invention. The method may be carried out, for example, in conjunction with a sensor as described above.

A first component of light incident in the direction of a first imaging element is directed onto an adjacently situated second imaging element in a step 1801. The second component of light incident in the direction of the first imaging element is allowed to fall on the first imaging element in a step 1803. The first component is detected, using the second imaging element, in a step 1805. A first image signal may be output, an intensity value of the first image signal corresponding to an intensity of the light detected by the second imaging element. The second component is detected, using the first imaging element, in a step 1807. A second image signal may be output, an intensity value of the second image signal corresponding to an intensity of the light detected by the first imaging element.

Figure 19:
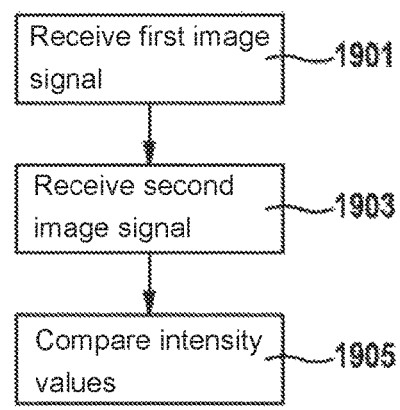
FIG. 19 shows a flow chart of a method for ascertaining color information of light which is detected by a sensor according to one exemplary embodiment of the present invention.

FIG. 19 shows a method for ascertaining color information of light detected by a sensor according to one exemplary embodiment of the present invention. The method may be carried out, for example, in conjunction with a sensor as described above. The method may be combined with the method described with reference to FIG. 18.

A first image signal which represents an image signal of a first imaging element is received in a step 1901, and a second image signal which represents an image signal of a second imaging element is received in a step 1903. An intensity value of the first image signal is compared to an intensity value of the second image signal in a step 1905. The color information of the light which is detected by the sensor may be determined as a function of a size ratio between the intensity values of the two image signals.

The exemplary embodiments which are described, and shown in the figures, have been selected only as examples. Different exemplary embodiments may be combined with one another, either completely or with respect to individual features. In addition, one exemplary embodiment may be supplemented by features of another exemplary embodiment. Furthermore, method steps according to the present invention may be repeated, and carried out in a sequence different from that described.

What is claimed is:

1. A sensor for detecting light, comprising:
   an imager having a first imaging element and a second imaging element situated adjacent to the first imaging element; and
   an optical element for directing a first component of light incident in a direction of the first imaging element onto the second imaging element, and for allowing a second component of the light incident in the direction of the first imaging element to strike the first imaging element, wherein:
   the first component of light has a first frequency,
   the second component of light has a second frequency that is different than the first frequency, and
   the optical element includes one of a diffuser and a defocusing device that expands at least one of the first component and the second component.

2. The sensor as recited in claim 1, wherein the optical element removes frequency components of the light which are above a threshold.

3. The sensor as recited in claim 1, wherein:
   the second imaging element is sensitive to a first color and is not sensitive to a second color, and
   the first imaging element is sensitive to the second color.

4. The sensor as recited in claim 1, wherein the optical element includes a diffraction structure, situated at a distance from the first and second imaging elements, for diffracting the first component of the light, incident in the direction of the first imaging element, in a direction of the second imaging element.

5. The sensor as recited in claim 4, wherein the diffraction structure of the optical element has one of a lattice structure, a linear structure, and a point structure.

6. The sensor as recited in claim 4, wherein:
   the first imaging element and the second imaging element have the same color sensitivity, and
   the diffraction structure is a color filter.

7. The sensor as recited in claim 1, wherein the imager is a semiconductor element.

8. A method for detecting light, comprising:
   directing a first component of light incident in a direction of a first imaging element onto a second imaging element, the first imaging element being situated adjacent to the second imaging element on an imager;
   allowing a second component of the light incident in the direction of the first imaging element to strike the first imaging element;
   detecting the first component via the second imaging element; and
   detecting the second component via the first imaging element, wherein:
   the first component of light has a first frequency,
   the second component of light has a second frequency that is different than the first frequency, and
   at least one of the first component and the second component is expanded via one of a diffuser and a defocusing device.

9. A method for ascertaining a color information of light detected by a sensor by directing a first component of light incident in a direction of a first imaging element onto a second imaging element, the first imaging element being situated adjacent to the second imaging element on an imager; allowing a second component of the light incident in the direction of the first imaging element to strike the first imaging element; detecting the first component via the second imaging element; and detecting the second component via the first imaging element, the method for ascertaining the color information comprising:
   comparing an intensity value of a first image signal of the first imaging element to an intensity value of a second image signal of the second imaging element in order to ascertain the color information, wherein:
   the first component of light has a first frequency,
   the second component of light has a second frequency that is different than the first frequency, and
   at least one of the first component and the second component is expanded via one of a diffuser and a defocusing device.

10. A device for ascertaining a color information of light detected by a sensor by directing a first component of light incident in a direction of a first imaging element onto a second imaging element, the first imaging element being situated adjacent to the second imaging element on an imager; allowing a second component of the light incident in the direction of the first imaging element to strike the first imaging element; detecting the first component via the second imaging element; and detecting the second component via the first imaging element, the device comprising:
   an arrangement for comparing an intensity value of a first image signal of the first imaging element to an intensity value of a second image signal of the second imaging element in order to ascertain the color information, wherein:
   the first component of light has a first frequency,
   the second component of light has a second frequency that is different than the first frequency, and
   at least one of the first component and the second component is expanded via one of a diffuser and a defocusing device.

11. A sensor for detecting light, comprising:
- an imager having a first imaging element and a second imaging element situated adjacent to the first imaging element; and
- an optical element for directing a first component of light incident in a direction of the first imaging element onto the second imaging element, and for allowing a second component of the light incident in the direction of the first imaging element to strike the first imaging element, wherein:
  - the second imaging element is sensitive to a first color and is not sensitive to a second color,
  - the first imaging element is sensitive to the second color,
  - the optical element directs the first component, corresponding to the first color, of the light incident in the direction of the first imaging element onto the second imaging element,
  - the optical element allows the second component, corresponding to the first color, of the light incident in the direction of the first imaging element to strike the first imaging element, and
  - the optical element allows a third light component, corresponding to the second color, of the light incident in the direction of the first imaging element to fall completely on the first imaging element.

* * * * *